US010336458B2

(12) United States Patent
Guillemaut et al.

(10) Patent No.: US 10,336,458 B2
(45) Date of Patent: Jul. 2, 2019

(54) AIRCRAFT ASSEMBLY COMPRISING A MOUNTING STRUT BUILT INTO THE NACELLE AND ARRANGED AT THE REAR SECTION OF THE FUSELAGE

(71) Applicant: Airbus Operations (S.A.S.), Toulouse (FR)

(72) Inventors: Julien Guillemaut, Toulouse (FR); Sébastien Alby, Tournefeuille (FR); Jérôme Colmagro, Toulouse (FR); Pascal Pome, Cepet (FR); Jonathan Blanc, Blagnac (FR); Thomas Robiglio, Toulouse (FR); Tobias Sjostrom, Toulouse (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 528 days.

(21) Appl. No.: 14/575,332

(22) Filed: Dec. 18, 2014

(65) Prior Publication Data

US 2015/0259074 A1    Sep. 17, 2015

(30) Foreign Application Priority Data

Dec. 23, 2013 (FR) ...................................... 13 63451

(51) Int. Cl.
*B64D 27/26* (2006.01)
*B64D 27/20* (2006.01)

(52) U.S. Cl.
CPC ............. *B64D 27/26* (2013.01); *B64D 27/20* (2013.01); *B64D 2027/262* (2013.01)

(58) Field of Classification Search
CPC .................... B64D 27/26; B64D 2027/262
See application file for complete search history.

(56) References Cited

U.S. PATENT DOCUMENTS 2,760,898 A     8/1956  Voelker
3,222,017 A *  12/1965  Bobo ..................... B64D 27/20
                                                          244/54

(Continued)

FOREIGN PATENT DOCUMENTS

CA    2 486 875 A1    6/2005
CA    2 511 847 A1    1/2006
(Continued)

OTHER PUBLICATIONS

Non-Final Office Action for U.S. Appl. No. 13/724,475 dated Dec. 21, 2015.
(Continued)

*Primary Examiner* — Joseph W Sanderson
*Assistant Examiner* — Aaron M Rodziwicz
(74) *Attorney, Agent, or Firm* — Jenkins, Wilson, Taylor & Hunt, P.A.

(57) ABSTRACT

In order to reduce engine deformation, the subject matter disclosed herein provides an assembly for an aircraft, comprising an aircraft rear section, an engine, a nacelle, and a mounting strut for mounting the engine on the rear section, the assembly also comprising mounting for mounting the engine on a rigid structure of the strut, the mounting comprising two engine mounts designed to react the axial thrust forces generated by the engine. According to the subject matter disclosed herein, the rigid structure of the strut comprises a first portion partially enveloping the engine, this first portion comprising an external skin forming part of an external aerodynamic surface of the nacelle, and the two engine mounts are arranged diametrically opposite each other at the rear of the rigid structure, being attached to the first portion.

20 Claims, 5 Drawing Sheets

(56) References Cited

U.S. PATENT DOCUMENTS

| | | | |
|---|---|---|---|
| 3,357,657 A | 12/1967 | Ferrel | |
| 3,416,274 A | 12/1968 | Webb | |
| 3,779,006 A | 12/1973 | Lewis | |
| 3,818,469 A | 6/1974 | Lindberg | |
| 4,044,973 A * | 8/1977 | Moorehead | B64D 27/26 244/54 |
| 4,229,497 A | 10/1980 | Piazza | |
| 4,507,011 A | 3/1985 | Brown | |
| 4,767,656 A | 8/1988 | Chee | |
| 4,801,496 A | 1/1989 | Buchacher | |
| 4,821,980 A * | 4/1989 | Clausen | B64D 27/26 244/54 |
| 4,946,526 A | 8/1990 | Petty-Galis et al. | |
| 5,064,144 A | 11/1991 | Chee | |
| 5,065,959 A * | 11/1991 | Bhatia | B64D 27/14 244/54 |
| 5,429,066 A | 7/1995 | Lewit | |
| 5,443,229 A * | 8/1995 | O'Brien | B64D 27/20 244/54 |
| 5,524,846 A | 6/1996 | Shine | |
| 5,860,276 A | 1/1999 | Newton | |
| 5,908,591 A | 6/1999 | Lewit | |
| 5,910,094 A | 6/1999 | Kraft | |
| 6,820,334 B2 | 11/2004 | Kebbede et al. | |
| 7,195,418 B2 | 3/2007 | Durand et al. | |
| 7,448,573 B2 | 11/2008 | Lafont | |
| 7,607,609 B2 | 10/2009 | Levert | |
| 7,625,618 B1 | 12/2009 | Allen et al. | |
| 7,677,044 B2 | 3/2010 | Barbeln | |
| 7,909,290 B2 | 3/2011 | Cooper | |
| 7,950,604 B2 | 5/2011 | Combes | |
| 8,222,165 B2 | 7/2012 | Olver | |
| 8,226,029 B2 | 7/2012 | Haramburu | |
| 8,251,311 B2 | 8/2012 | Combes | |
| 8,336,812 B2 | 12/2012 | Beaufort | |
| 8,408,493 B2 | 4/2013 | Barnard et al. | |
| 8,413,925 B2 | 4/2013 | Martinou | |
| 8,540,186 B2 | 9/2013 | Marche | |
| 8,646,724 B2 | 2/2014 | Bonnet et al. | |
| 8,714,488 B2 | 5/2014 | Burns et al. | |
| 8,789,790 B2 | 7/2014 | Marche | |
| 8,864,066 B2 | 10/2014 | Marche | |
| 9,067,688 B2 | 6/2015 | Bellabal et al. | |
| 9,359,954 B2 | 6/2016 | Demoulin et al. | |
| 9,522,739 B2 | 12/2016 | Chouard et al. | |
| 2002/0178992 A1 | 12/2002 | Lewit | |
| 2003/0014963 A1 | 1/2003 | Aramburu | |
| 2003/0178525 A1 | 9/2003 | Ramer et al. | |
| 2003/0201366 A1 | 10/2003 | Connelly | |
| 2003/0213871 A1 | 11/2003 | Howe | |
| 2004/0094669 A1 | 5/2004 | Koffi et al. | |
| 2004/0194975 A1 | 10/2004 | Trumper | |
| 2005/0151017 A1 | 7/2005 | Noiseux | |
| 2005/0178887 A1* | 8/2005 | Beutin | B64D 27/20 244/54 |
| 2005/0183260 A1 | 8/2005 | Meyer | |
| 2005/0224655 A1 | 10/2005 | Guittard et al. | |
| 2005/0274485 A1 | 12/2005 | Huggins | |
| 2006/0038066 A1* | 2/2006 | Udall | B64D 27/20 244/54 |
| 2006/0208135 A1 | 9/2006 | Liguore et al. | |
| 2007/0205324 A1* | 9/2007 | Diochon | B64D 27/26 244/54 |
| 2007/0246603 A1* | 10/2007 | Udall | B64D 27/20 244/54 |
| 2008/0029644 A1 | 2/2008 | Martinez Cerezo et al. | |
| 2008/0105782 A1* | 5/2008 | Beardsley | F02C 7/20 244/54 |
| 2008/0116618 A1 | 5/2008 | Martin | |
| 2008/0272229 A1 | 11/2008 | Lafont et al. | |
| 2008/0290214 A1 | 11/2008 | Guzman | |
| 2008/0302912 A1 | 12/2008 | Yip et al. | |
| 2009/0020646 A1 | 1/2009 | Normand et al. | |
| 2009/0065644 A1 | 3/2009 | Jacques | |
| 2009/0090811 A1* | 4/2009 | Llamas Sandin | B64D 27/14 244/54 |
| 2009/0212155 A1 | 8/2009 | Huggins | |
| 2009/0308022 A1 | 12/2009 | Kiskiras | |
| 2009/0320292 A1 | 12/2009 | Brennan | |
| 2010/0009124 A1 | 1/2010 | Robins | |
| 2011/0084428 A1 | 4/2011 | Wade | |
| 2011/0121132 A1 | 5/2011 | Crook | |
| 2011/0132523 A1 | 6/2011 | Evens et al. | |
| 2011/0139925 A1 | 6/2011 | Lisiewicz et al. | |
| 2011/0284686 A1 | 11/2011 | Caruel | |
| 2012/0034416 A1 | 2/2012 | Lutz | |
| 2012/0080555 A1 | 4/2012 | Lafont et al. | |
| 2012/0082808 A1 | 4/2012 | Lemains | |
| 2012/0097323 A1 | 4/2012 | Nitsch | |
| 2012/0104162 A1 | 5/2012 | West | |
| 2012/0227370 A1 | 9/2012 | Mickelsen | |
| 2013/0105622 A1 | 5/2013 | Journade | |
| 2013/0187004 A1 | 7/2013 | Caballero et al. | |
| 2013/0232768 A1 | 9/2013 | Suciu | |
| 2014/0064950 A1* | 3/2014 | Brochard | F01D 25/24 415/208.1 |
| 2014/0102114 A1 | 4/2014 | Demoulin | |
| 2014/0322479 A1 | 10/2014 | Plaindoux | |
| 2015/0048202 A1 | 2/2015 | Takeuchi | |
| 2015/0166192 A1 | 6/2015 | Ewens et al. | |
| 2015/0175272 A1 | 6/2015 | Brochard et al. | |
| 2015/0197341 A1 | 7/2015 | Ewens et al. | |

FOREIGN PATENT DOCUMENTS

| | | | |
|---|---|---|---|
| CA | 2801366 A1 * | 12/2011 | B64D 27/14 |
| CA | 2839336 A1 * | 12/2012 | B64D 27/14 |
| CN | 102245472 A | 11/2011 | |
| DE | 29 622 647 U1 | 5/1997 | |
| EP | 1216816 A1 | 6/2002 | |
| EP | 1541464 | 6/2005 | |
| EP | 2332834 A2 * | 6/2011 | B64D 27/14 |
| EP | 2436601 A1 | 4/2012 | |
| EP | 2631180 A1 * | 8/2013 | B64D 27/26 |
| FR | 1363046 A | 6/1964 | |
| FR | 2127472 A6 | 10/1972 | |
| FR | 2891243 A1 | 3/2007 | |
| FR | 2891252 A1 | 3/2007 | |
| FR | 2915175 A1 | 10/2008 | |
| FR | 2915458 | 10/2008 | |
| FR | 2917712 | 12/2008 | |
| FR | 2935953 A1 * | 3/2010 | B64D 27/14 |
| FR | 2939101 A1 | 6/2010 | |
| FR | 2942165 | 8/2010 | |
| FR | 2946621 A1 | 12/2010 | |
| FR | 2950322 A1 * | 3/2011 | B64D 27/18 |
| FR | 2970700 A1 * | 7/2012 | B64D 27/26 |
| FR | 2976914 A1 | 12/2012 | |
| FR | 2979829 A1 | 3/2013 | |
| FR | 2982841 A1 | 5/2013 | |
| FR | 2994941 A1 * | 3/2014 | B64D 27/26 |
| FR | 2996823 A1 | 4/2014 | |
| WO | WO-02/46625 | 6/2002 | |
| WO | WO-2006/100400 | 9/2006 | |
| WO | WO-2009/040864 A1 | 4/2009 | |
| WO | WO 2010066985 A1 * | 6/2010 | B64D 27/26 |
| WO | WO-2012/098331 | 7/2012 | |
| WO | WO-2012/175843 A1 | 12/2012 | |

OTHER PUBLICATIONS

Final Office Action for U.S. Appl. No. 13/979,939 dated Mar. 9, 2016.

Restriction Requirement for U.S. Appl. No. 14/571,772 dated Apr. 15, 2016.

Non-Final Office Action for U.S. Appl. No. 14/571,786 dated Jun. 3, 2016.

Non-Final Office Action for U.S. Appl. No. 13/979,939 dated Aug. 19, 2015.

French Search Report for Application No. FR 1162499 dated Jul. 17, 2012.

(56) References Cited

OTHER PUBLICATIONS

French International Search Report for Application No. PCT/FR2012/050102 dated Jul. 12, 2012.
Non-Final Office Action for U.S. Appl. No. 13/724,475 dated Jun. 20, 2013.
Final Office Action for U.S. Appl. No. 13/724,475 dated Dec. 26, 2013.
French Search Report for Application No. FR 1363046 dated Aug. 6, 2014.
French Search Report for Application No. FR 1363451 dated Aug. 18, 2014.
French Search Report for Application No. FR 1362781 dated Aug. 19, 2014.
French Search Report for Application No. FR 1362777 dated Aug. 19, 2014.
Non-Final Office Action for U.S. Appl. No. 14/573,447 dated Nov. 4, 2016.
Non-Final Office Action for U.S. Appl. No. 13/724,475 dated Dec. 22, 2016.
Final Office Action for U.S. Appl. No. 14/571,786 dated Jan. 12, 2017.
Final Office Action for U.S. Appl. No. 14/571,772 dated Jan. 26, 2017.
English Translation of French International Search Report and Written Opinion for Application No. PCT/FR2012/050102 dated Jul. 19, 2012.
Notice of Allowance for U.S. Appl. No. 13/979,939 dated Apr. 11, 2017.
Restriction Requirement for U.S. Appl. No. 14/573,447 dated Jun. 14, 2016.
Non-Final Office Action for U.S. Appl. No. 14/571,772 dated Jul. 21, 2016.
Final Office for U.S. Appl. No. 13/724,475 dated Jul. 28, 2016.
Final Office for U.S. Appl. No. 14/133,023 dated Aug. 18, 2016.
Non-Final Office Action for U.S. Appl. No. 13/979,939 dated Aug. 25, 2016.
Final Office Action for U.S. Appl. No. 13/724,475 dated Aug. 24, 2017.
Notice of Allowance for U.S. Appl. No. 14/573,447 dated Sep. 8, 2017.
Notice of Allowance for U.S. Appl. No. 14/571,786 dated Sep. 22, 2017.
Final Office Action for U.S. Appl. No. 14/571,786 dated Apr. 21, 2017.
Final Office Action for U.S. Appl. No. 14/573,447 dated May 1, 2017.
Supplemental Notice of Allowability for U.S. Appl. No. 13/979,939 dated May 2, 2017.
Notice of Allowance and Applicant Initiated Interview Summary for U.S. Appl. No. 14/571,772 dated May 12, 2017.
First Search for Chinese Application No. 2014108069166 dated Jan. 24, 2018, retrieved from Global Dossier on Sep. 10, 2018.
First Chinese Office Action for Chinese Application No. 2014108069166 dated Feb. 2, 2018.
Second Chinese Office Action for Chinese Application No. 2014108069166 dated Aug. 15, 2018.

\* cited by examiner

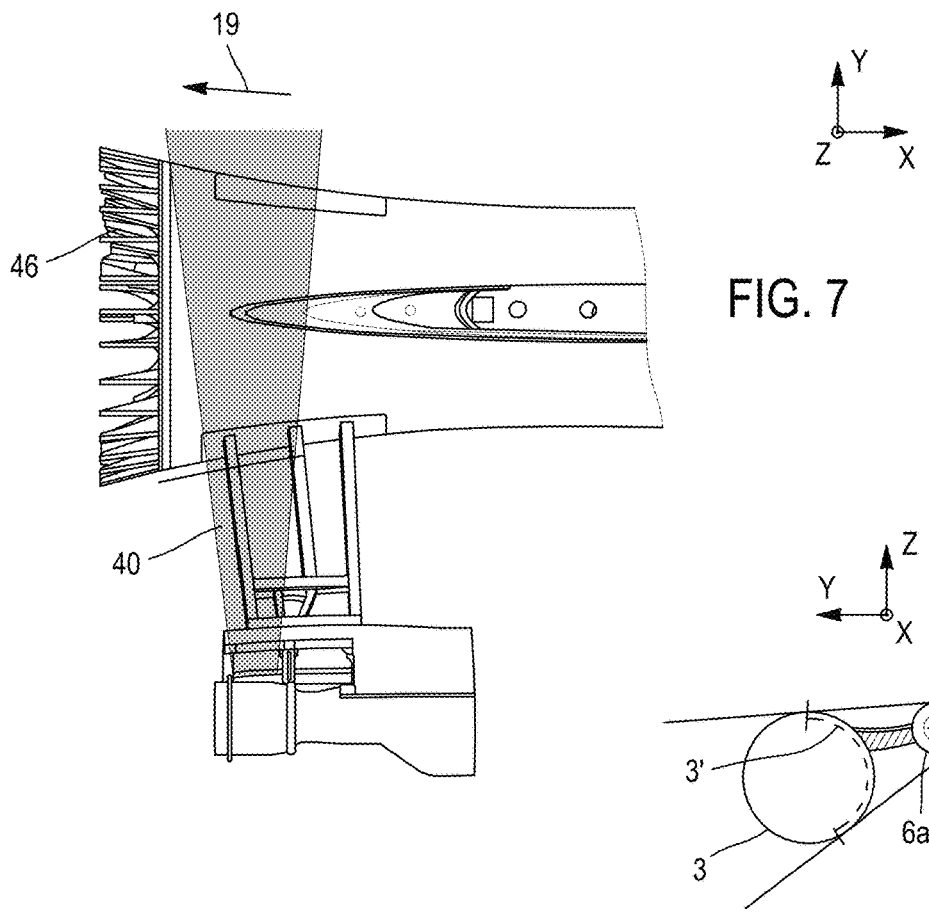
FIG. 7
FIG. 8
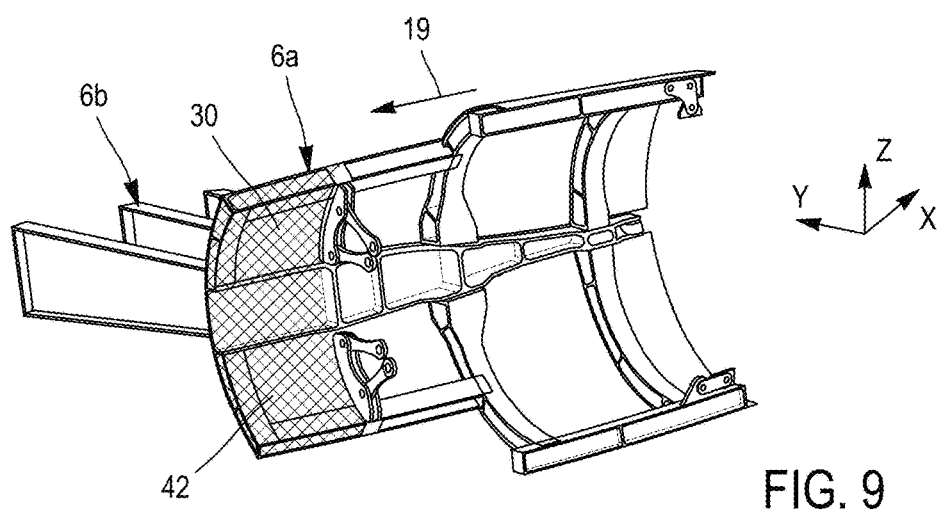
FIG. 9

AIRCRAFT ASSEMBLY COMPRISING A MOUNTING STRUT BUILT INTO THE NACELLE AND ARRANGED AT THE REAR SECTION OF THE FUSELAGE

CROSS-REFERENCE TO RELATED APPLICATION

This application claims the benefit of and priority to French Patent Application No. 13 63451 filed on Dec. 23, 2013, the entire disclosure of which is incorporated by reference herein.

TECHNICAL FIELD

The subject matter disclosed herein relates to the field of the mounting of an engine at the rear section of an aircraft, namely preferably on the rear section of the fuselage or on the vertical empennage.

It relates more specifically to the mounting of an engine the receiver of which is a pair of contra-rotating propellers, arranged at the rear of the gas generator. This type of engine is generally referred to as an "open rotor" engine in "pusher configuration".

The subject matter disclosed herein also relates to an aircraft equipped with such an assembly. It preferably applies to commercial aeroplanes.

BACKGROUND

On certain types of aircraft, the engines are fixed at the rear section of the fuselage rather than suspended beneath the wing structure as in the more conventional case. Alternatively, an engine may be fixed to the vertical empennage of the aircraft, again at the rear section thereof.

Engines are mounted using complex mounting devices, also referred to as "EMS" (which stands for "Engine Mounting Structure"), or even mounting struts. The mounting devices usually employed have a rigid structure referred to as primary structure. This primary structure forms a box section, i.e. is made up of an assembly of lower and upper spars joined together by a plurality of transverse stiffening ribs situated inside the box section.

The primary structure of these struts is designed to allow the static and dynamic forces generated by the engines, such as the weight, the thrust, or even the various dynamic forces to be transmitted to the fuselage or to the empennage.

The transmission of forces between the engine and the primary structure is performed conventionally by mounting comprising a front engine mount, one or more rear engine mounts, and a device that reacts thrust forces. The latter device usually comprises two lateral link rods for reacting the thrust forces, these being arranged symmetrically and connected to the rigid structure near the front engine mount. Alternatively, a mount referred to as a "spigot mount" may be provided, allowing thrust forces to be transmitted in shear.

Although this solution is satisfactory overall, there is still room for improvement in terms of engine deformation. Indeed, the engine deformation observed during operation, particularly deformation caused by flexing along the transverse axis of the engine, leads to blade tip rotor wear. This wear increases the clearances between the blades and the casings that surround them, resulting in a drop in the overall efficiency of the engine and in a reduction of the life thereof.

SUMMARY

It is therefore an object of the subject matter disclosed herein to provide an assembly for an aircraft that at least partially overcomes the abovementioned problems which are encountered in the solutions of the prior art.

In order to do this, one subject of present disclosure is an assembly for an aircraft, comprising an aircraft rear section, an engine, a nacelle, and a mounting strut for mounting the engine on the rear section, the assembly also comprising a mounting for mounting the engine on a rigid structure of the mounting strut, the mounting comprising two engine mounts designed to react the axial thrust forces generated by the engine.

According to the subject matter disclosed herein, the rigid structure of the strut comprises a first portion partially enveloping the engine, the first portion comprising an external skin forming part of an external aerodynamic surface of the nacelle, and the two engine mounts that react the axial thrust forces are arranged diametrically opposite each other at the rear of the rigid structure, being attached to the first portion.

With this particular layout, the subject matter disclosed herein advantageously makes it possible to reduce engine deformation and therefore contributes to limiting blade tip rotor wear. That makes it possible to offer a satisfactory overall efficiency.

In addition, siting the engine mounts that react the axial thrust forces at the rear section of the rigid structure of the strut becomes easier because this rear section usually corresponds to a region of the engine which is not provided with a great deal of equipment. This siting also allows the front of the rigid structure to be freed up, thereby offering better nacelle ventilation. Moreover, the attachment of the other nacelle cowls is improved because it can be performed directly onto the rigid structure of the mounting strut built into the nacelle.

The subject matter disclosed herein provides at least one of the following optional features, considered in isolation or in combination.

The mounting for mounting the engine on the rigid structure of the strut also comprise a plurality of other engine mounts which are arranged in front of the engine mounts that react the axial thrust forces and are also attached to the first portion.

The first portion of the rigid structure comprises a plurality of panels which are stiffened by structural frames and/or spars, these panels together forming the external skin.

The structural frames and/or spars that stiffen the panels bear the two engine mounts that react the axial thrust forces, and preferably all the other engine mounts also.

The rigid structure of the mounting strut also comprises a second portion for offsetting the first portion, the second portion being fixed to the fuselage and allowing the first portion to be offset in relation to this same fuselage.

The rigid structure comprises a plurality of spars extending in a direction of offsetting of the engine relative to the fuselage, as well as an axial beam connecting the spars and supporting the first portion of the rigid structure.

At least part of the first portion of the rigid structure is designed to constitute a shield protecting the fuselage against an engine break up.

More specifically, at least the part of the first portion of the rigid structure that is situated facing a low-pressure compressor of the engine is designed to constitute a shield protecting the fuselage against an engine break up.

The engine comprises a gas generator and a receiver with a pair of unducted contra-rotating propellers, which is arranged at the rear of the gas generator. Other types of engine may nevertheless be envisaged, without departing from the scope of the subject matter disclosed herein. These may for example include turbojet engines or turboprops, or even "open rotor" engines in "puller configuration", in which engines the receiver involving a pair of contra-rotating propellers is positioned in front of the gas generator.

The two engine mounts that react the axial thrust forces are attached to the engine near the junction between the gas generator and the receiver with a pair of unducted contra-rotating propellers.

The nacelle comprises nacelle elements including articulated cowls, which are mounted on the first portion of the rigid structure of the mounting strut.

The aircraft rear section to which the subject matter disclosed herein relates is the rear section of the fuselage of the aircraft, or alternatively a vertical empennage of the aircraft which is fixed to this fuselage rear section.

Another subject of the subject matter disclosed herein is an aircraft comprising an assembly as described hereinabove.

Further advantages and features of the subject matter disclosed herein will become apparent during the course of the nonlimiting detailed description below.

BRIEF DESCRIPTION OF THE DRAWINGS

This description will be given with reference to the attached drawings, among which:

FIG. 7 is a plan view of part of the engine assembly according to another preferred embodiment of the subject matter disclosed herein;

FIG. 8 is a schematic view in cross section of the engine assembly shown in the preceding figure;

FIG. 9 is a perspective view of the primary structure of the mounting strut with which the assembly for an aircraft shown in FIGS. 7 and 8 is equipped;

DETAILED DESCRIPTION

Figure 1:
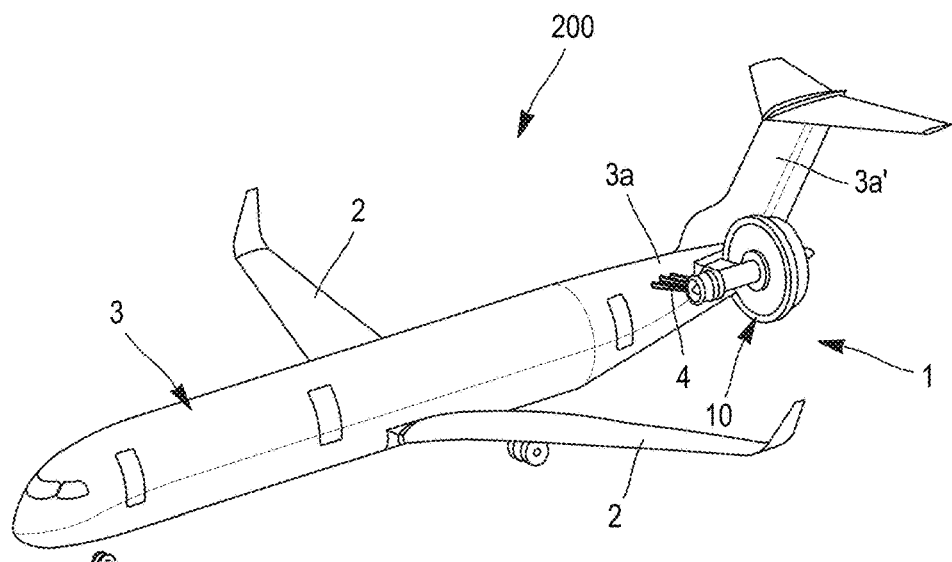
FIG. 1 depicts a perspective view of an aircraft comprising an assembly according to the subject matter disclosed herein.

Reference is made to FIG. 1 which depicts an aircraft 200 comprising wings 2 fixed to a fuselage 3 at the rear of which an assembly 1 according to the subject matter disclosed herein is arranged. This assembly 1 comprises a rear section 3a of the fuselage, an engine 10 and a mounting strut 4 for mounting the engine 10 on the fuselage rear section 3a. It may be noted that within the assembly 1, two engines 10 are arranged respectively one on each side of the fuselage rear section 3a. However, in the remainder of the description, only the interaction between one of the two engines 10 and the fuselage rear section 3a will be described.

Figure 2:
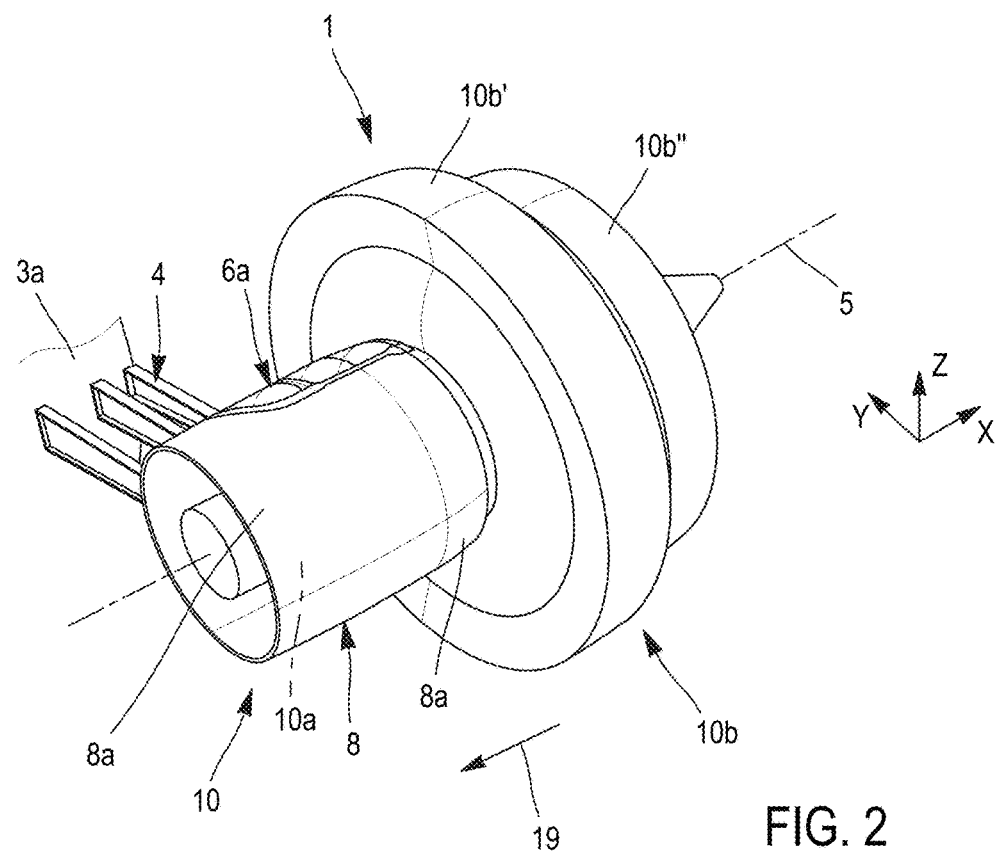
FIG. 2 depicts an enlarged perspective view of part of the assembly for an aircraft which is shown in the preceding figure.

FIG. 2 depicts the assembly 1 in enlarged format.

As mentioned hereinabove, this assembly 1 comprises the rear section 3a of the fuselage, the engine 10, a nacelle 8 surrounding the engine, and the mounting strut 4 for mounting the engine 10 on the fuselage rear section 3a. The engine 10 here is preferably of the "open rotor" type in the "pusher configuration". It therefore comprises a gas generator 10a and a receiver 10b having a pair of unducted contra-rotating propellers, which is arranged at the rear of the gas generator. In FIG. 2, the contra-rotating propellers have been depicted only schematically as rings 10b' and 10b".

The assembly 1, which also comprises mounting 7 for mounting the engine 10 on the strut will now be described in greater detail with reference to FIGS. 2 to 6. In this respect, it may be noted that the mounting for mounting the strut on the fuselage are produced in a conventional way. They will therefore not be described further.

Throughout the description which will follow, by convention, the direction X corresponds to the longitudinal direction of the strut 4, which can also be likened to the longitudinal direction of the engine 10 and of the assembly 1. This direction X is parallel to a longitudinal axis 5 of this engine 10. Furthermore, the direction Y corresponds to the direction oriented transversally to the strut 4 and which can also be likened to the transverse direction of the engine 10 and the assembly 1, whereas the direction Z corresponds to the vertical or heightwise direction. These three directions X, Y and Z are mutually orthogonal and form a direct trihedron.

Furthermore, the terms "front" and "rear" are to be considered in relation to a direction of forward travel of the aircraft which direction is encountered as a result of the thrust exerted by the engines 10, this direction being indicated schematically by the arrow 19.

Figure 3:
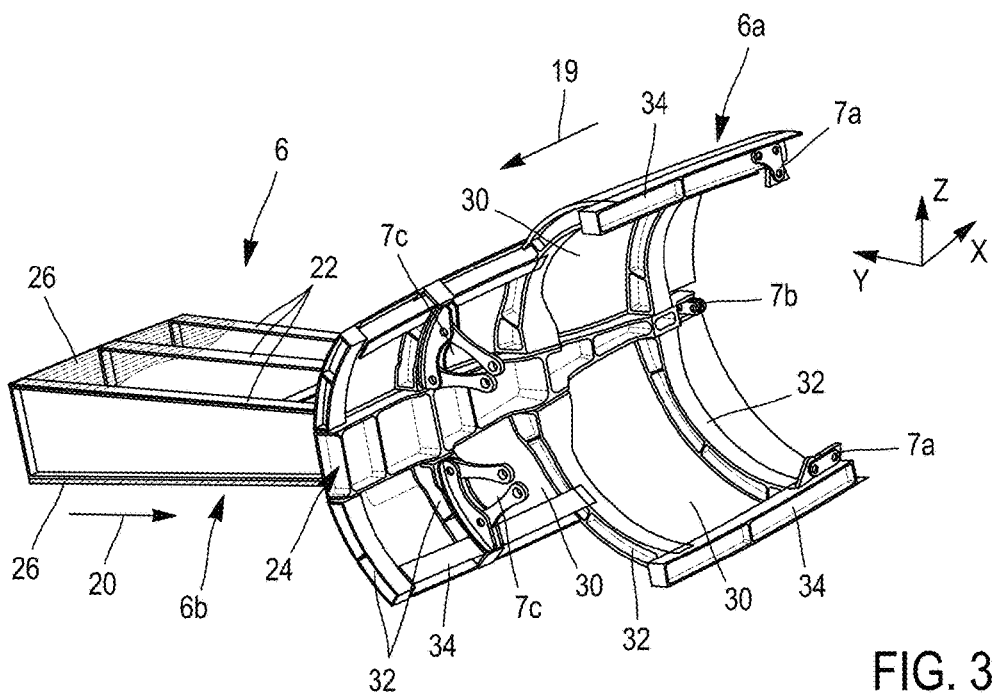
FIGS. 3 and 4 depict, from two different view points, perspective views of the rigid structure of the mounting strut that forms an integral part of the assembly shown in the preceding figure.
Figure 4:
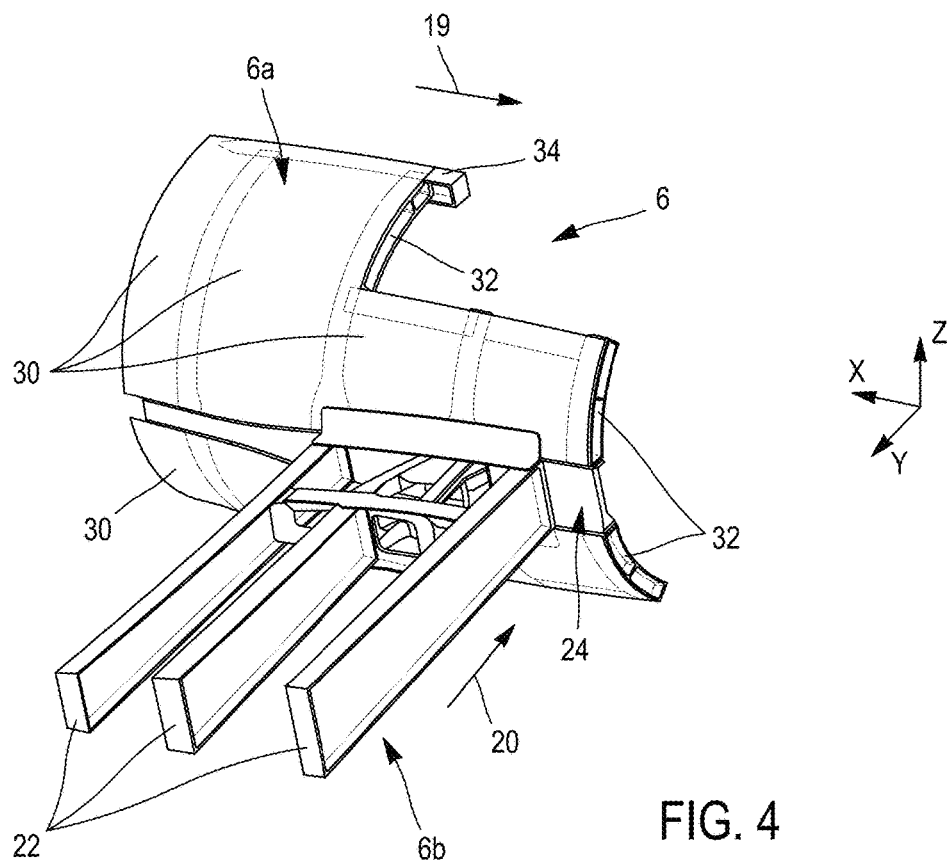
Figure 5:
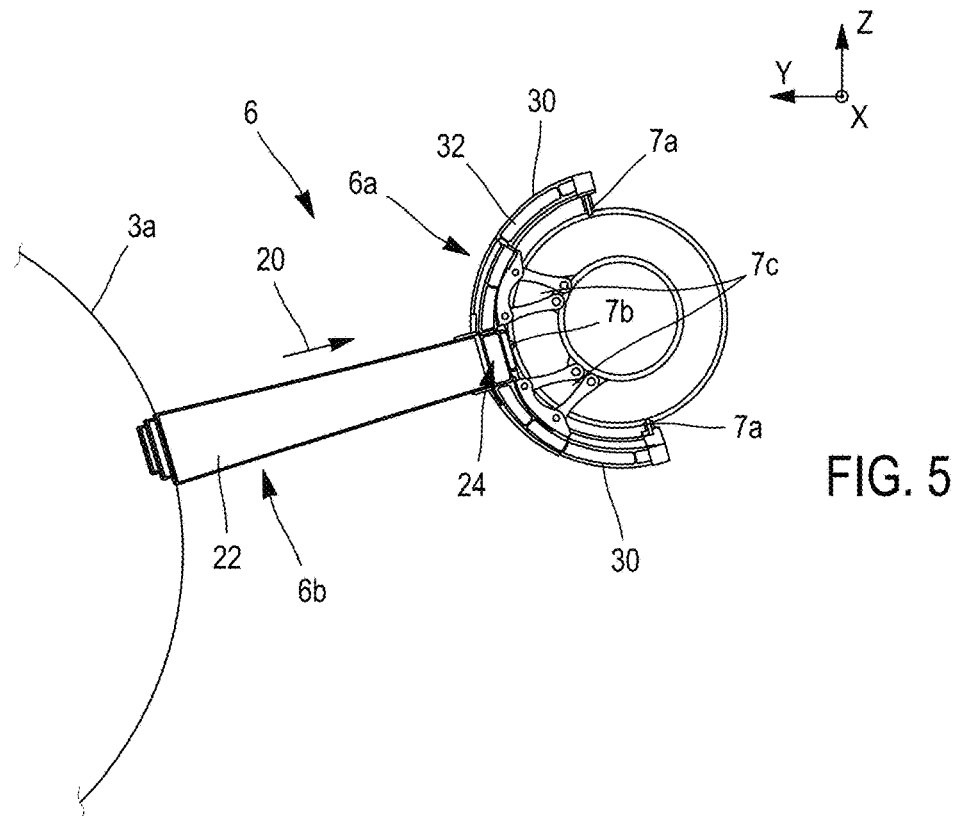
FIG. 5 depicts a face-on view of the rigid structure shown in the preceding figures, connected to the rear section of the fuselage of the aircraft.

FIGS. 3 to 5 depict the rigid structure 6 of the strut, also referred to as primary structure. The other constituent elements of this strut 4, which have not been depicted and which are of secondary structure type segregating and holding systems while at the same time supporting the aerodynamic fairings are conventional elements identical or similar to those encountered in the prior art. No detailed description thereof will therefore be given.

The rigid structure 6 comprises two distinct portions, namely a first portion 6a partially enveloping the engine 10, and a second portion 6b for offsetting the first portion 6a. So, this second, offsetting, portion 6b is fixed to the fuselage and allows the first portion 6a to be offset in relation to this same fuselage 3a, in a direction 20 of offsetting. To simplify the description, the direction 20 of offsetting indicated in the figures corresponds to the transverse direction Y. Nevertheless, this direction 20 of offsetting could be inclined with respect to the direction Y, preferably extending upwards with increasing distance away from the fuselage. The second portion 6b essentially comprises spars 22 extending in the direction 20 of offsetting, and spaced apart in the direction X. These substantially parallel spars 22, of which there are preferably three, are joined together at their distal ends by an axial beam 24 which extends on either side of this group of spars 22 in the direction X. In addition, panels 26 are preferably provided above and below this group of spars 22, in order to form a box section.

The axial beam 24 also provides support for the first portion 6a of the rigid structure 6. This first portion 6a is substantially cylindrical and partially envelops the engine 10. Nevertheless, with a view to being able to install engine equipment between this structure 6a and the engine casing, it is possible to create a local bump in the structure. The structure is preferably made up of several stiffened panels 30, although one single stiffened panel may suit, without departing from the scope of the subject matter disclosed herein. The panels 30 form an external skin of the rigid structure, which defines part of the external aerodynamic surface of the nacelle 8.

The first portion 6a therefore forms a shell around the engine 10, this cylindrical shell extending concentrically with respect to the engine, over an angular extent of between 90 and 180°. In addition, it may be noted that this angular extent can vary according to the zones of this first portion 6a. By way of indicative example, in the embodiment depicted, the front section of the portion 6a has a smaller angular extent than the rear section, because the forces passing through it are not as high. Thus, the design may be adapted to suit the loadings encountered, so as to optimize the overall mass of the strut as far as possible. By way of indication, it may be noted that the rear section has an angular extent of the order of 180°, notably so as to be able to support the engine mounts that react the axial thrust forces, as will be described later on.

The first portion 6a of the rigid structure of the strut extends over an axial length substantially identical to that of the axial beam 24 that supports it. The panels are stiffened using frames 32 of circular-arc overall shape which are arranged in YZ planes. These frames 32 follow the curvature of the panels 30 along which they run. They may be interrupted at the central beam 24 or alternatively extend in one piece from one end of the portion 6a to the other. The frames 32, which are spaced apart in the direction X, are supplemented by spars 34 which also serve to stiffen the panels 30. These spars 34 are arranged axially and run along the ends of the panels 30. These elements 32, 34 that stiffen the panels 30 enable the supporting of the engine mounts which constitute the mounting 7.

Among these mounts, there are two engine mounts 7a for reacting the axial thrust forces, which are arranged diametrically opposite one another at the rear of the rigid structure, connected to the first portion 6a thereof. More specifically, these two mounts 7a are connected to the rear end of the first portion, at the corresponding stiffening spars 34. Reaction of the forces is first of all supplemented by another rear mount 7b situated on the axial beam 24, in the same YZ plane as the two mounts 7a. It is also supplemented by other engine mounts situated further forward, still connected to the first portion 6a in the form of an enveloping shell. These more specifically are two front engine mounts 7c, each one dedicated to the reaction of forces other than the axial thrust forces. These front mounts 7c are borne by one of the frames 32 that stiffen the panels 30, preferably the frame situated furthest forward or the one situated just behind it as shown in FIG. 3. It may be noted that other mounts may be provided, particularly mounts providing a flexible connection between the engine and the rigid structure in order to filter out vibrations.

Figure 6:
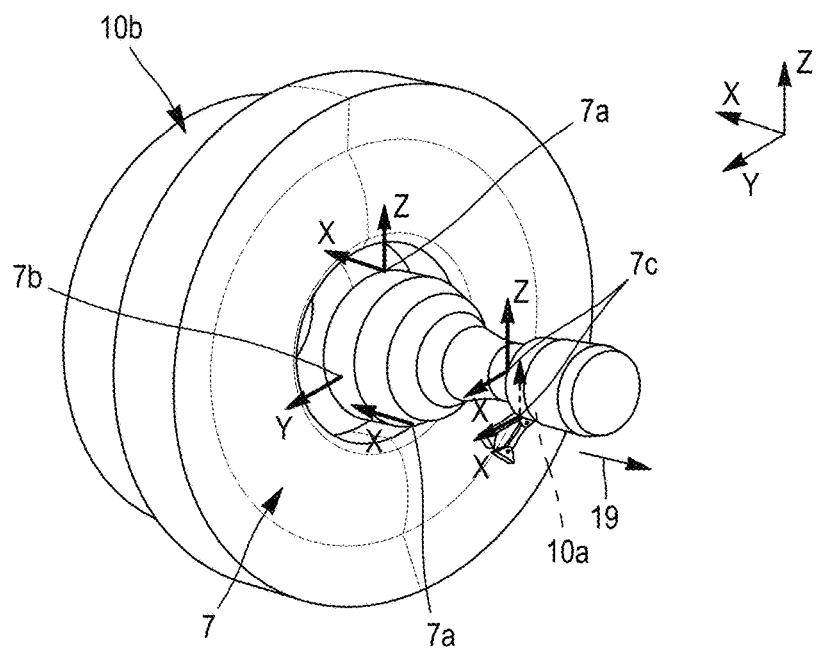
FIG. 6 schematically illustrates how the mounting for mounting the engine on the rigid structure of the mounting strut react forces.

As shown in FIG. 6, the axial thrust forces are reacted by the rear mounts 7a. Forces in the Y-direction are reacted by the rear mount 7b and the two front mounts 7c. Torque about the axis of the engine is reacted by the two front mounts 7c. It is preferably considered that one of the two front mounts 7c is on standby as far as reacting forces in the Z-direction is concerned, i.e. that under nominal conditions it does not transmit force. It transmits force if other mounts become broken, thereby performing a "failsafe" function. Finally, forces in this same Z-direction are reacted mainly by the upper rear mount 7a, which has the advantage of being in line with the centre of gravity of the engine. A small proportion of these forces in the Z-direction may nonetheless be handled by one of the two front mounts 7c.

The aforementioned engine mounts are produced in the conventional way, for example using shackles, yokes, fittings, etc. They are preferably made of steel or of titanium (the choice being based on the risks of engine fire and on the temperature in the zone in question), whereas the panels 30 and the stiffening elements 32, 34 are preferably based on titanium, although a solution using a composite material could be adopted for the panels 30. On the other hand, the stiffening elements may be made of steel if there is a need for a high degree of compactness, for example in the case of the rear frame situated close to the aerodynamic field of the blades.

These engine mounts are preferably articulated to the corresponding casings of the engine 10. In particular, the front mounts 7c are arranged in a YZ plane passing through a zone situated on or near the junction between the low-pressure compressor and the high-pressure compressor of the gas generator 10a. Moreover, the rear mounts 7a, 7b are arranged in a YZ plane passing through a zone situated on or near the junction between the gas generator 10a and the receiver 10b. As the front mounts 7c are not intended to react axial thrust forces, they are therefore less bulky and may more easily be installed at the front of the engine where a large proportion of the equipment is situated. In addition, arranging the mounts 7a at the rear rather than at the front of the rigid structure that an annular space that is clear enough to allow nacelle ventilation can be maintained between the nacelle and the engine. The air can in fact enter this annular space more easily than if the more bulky mounts 7a had been arranged at the front of the rigid structure. This improved ventilation thus adds to the main advantage conferred by the subject matter disclosed herein, namely that of reducing engine deformation during operation.

The portion 6a of the rigid structure 6 therefore forms an integral part of the nacelle 8, and vice versa. The nacelle 8 is therefore supplemented by other nacelle cowls 8a, referenced in FIG. 2. Some of these cowls 8a are fixed, others are articulated, preferably to the primary structure 6 of the strut. Indeed, it proves to be a relatively simple matter to articulate these cowls 8a to the first portion 6a, for example at the upper stiffening spar 34. As part of the nacelle 8 is structural, the other attached cowls 8a can advantageously be lightened in weight.

Reference is now made to FIGS. 7 to 9 which depict an assembly 1 according to another preferred embodiment of the subject matter disclosed herein. The elements and functions of the previous embodiment are repeated, but further specifics that reduce the mass and cost of the aircraft are added.

In effect, all or part of the first enveloping portion 6a is designed to constitute a shield protecting the fuselage 3 against an engine break up. It is here a matter of incorporating a UERF ("Uncontained Engine Rotor Failure") shield function with at least part of the enveloping portion 6a. The expression "UERF" conventionally refers to an engine break up in which a fragment of the engine is not contained by the engine casing. Thus, if a piece of rotor passing through the engine casing is thrown out, this piece will advantageously be stopped by the enveloping portion 6a of the rigid structure, which is designed and certified for performing such a function. Combining this standardized function with the nacelle 8/the enveloping structure 6a represents a pronounced technological break with conventional practice, which has been to implement this function on the aircraft fuselage. By being situated closer to the engine 10, it is possible to limit the extent of the panels involved in this function, both in terms of the axial direction and in terms of the circumferential direction. Specifically, as has been depicted schematically in FIG. 8, the circumferential length of the enveloping portion 6a may be very much less than that of the fuselage section 3' that it protects, which section 3' was beforehand itself designed to perform this shield function. This therefore results in a saving in terms of mass and cost, which is further accentuated by the reduction in the length required in the axial direction. In effect, as shown in FIG. 7, the zone at risk from scattered pieces of rotor extends frustoconically from the engine, widening axially towards the fuselage. So, the closer the shield is to the engine, the greater the extent to which its axial distance can be reduced while at the same time protecting the same area of the fuselage.

In this respect, FIG. 7 depicts the frustoconical at-risk zone 40, which starts in line with the most problematical part of the engine, namely the low-pressure compressor. It is therefore the part of the enveloping portion 6a facing this compressor that forms the shield. Nevertheless, it may be noted that the entire enveloping portion 6a could be built in the same way, thus forming a shield all the way along it. However, for preference, the design and/or the materials performing the shield function are used only for the relevant part facing the low-pressure compressor, allowing cost savings.

Furthermore, it may be noted that this function may adopt the form of a particular covering 42, as has been indicated schematically in FIG. 9. However, for preference, this shield function is afforded intrinsically by the stiffened panels 30, without the need to add anything further to them.

If these panels 30 are made of metal, they may for example be produced by a hot forming method, in order to meet the UERF protection standards in force. If they are made of composite material, the 3D weaving technique is preferably employed.

Finally, it may be noted that with the structural nacelle 8 forming the UERF protection shield, there is no longer any need to maintain a large axial clearance between the impenetrable rear end 46 of the aircraft, and the frustoconical at-risk zone 40. It is therefore possible to move this impenetrable rear end 46 back and conceive of fitting an additional row of cabin seats, and/or of moving the engines forward in order to obtain an aircraft centre of gravity that is positioned more optimally and a more compact tail cone.

Figure 10:
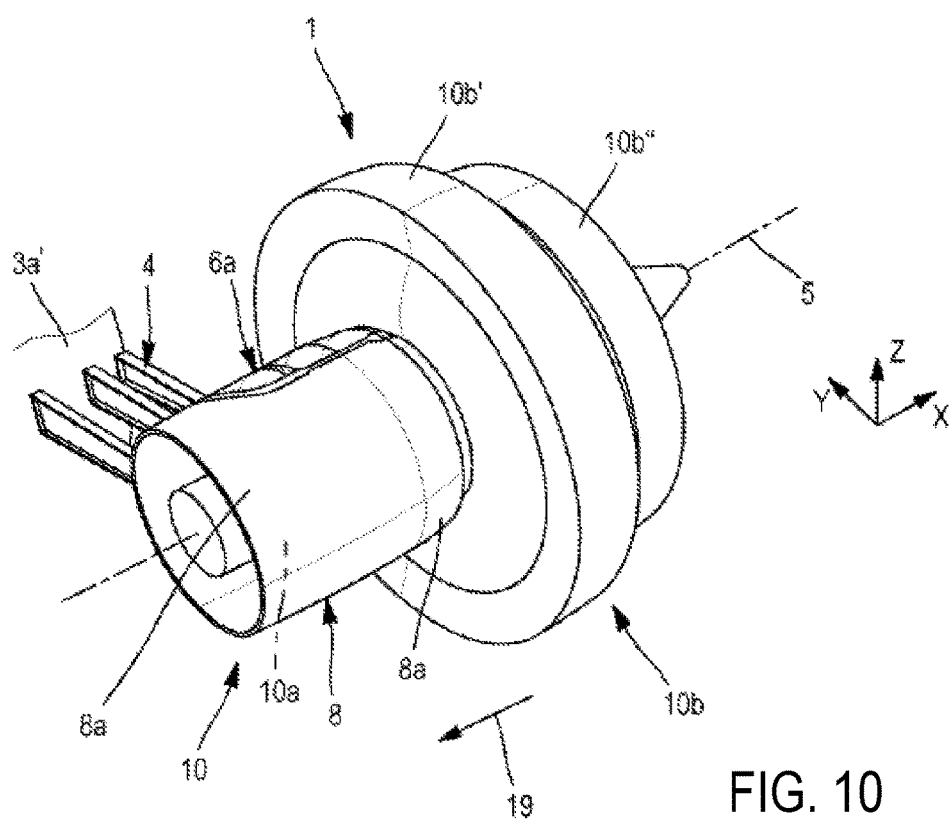
FIG. 10 depicts an enlarged perspective view of part of the assembly for an aircraft mounted on the vertical empennage of the aircraft.

Of course, various modifications can be made by those skilled in the art to the subject matter disclosed herein which has just been described solely by way of nonlimiting examples. In particular, the subject matter disclosed herein applies also to the scenario in which the engine is mounted on the vertical empennage of 3a' of the aircraft, as shown in FIG. 10, this empennage being fixed to the rear section 3a of the fuselage.

While at least one exemplary embodiment of the present disclosure has been shown and described, it should be understood that modifications, substitutions and alternatives may be apparent to one of ordinary skill in the art and can be made without departing from the scope of the disclosure described herein. This application is intended to cover any adaptations or variations of the specific embodiments discussed herein. In addition, in this disclosure, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

The invention claimed is:

1. An assembly for an aircraft having a fuselage, the assembly comprising:
   a rear section of the aircraft;
   an engine;
   a nacelle;
   a mounting strut for mounting the engine on the rear section; and
   a mounting for mounting the engine on a rigid structure of the mounting strut,
   wherein the mounting comprises two engine mounts to react axial thrust forces generated by the engine,
   wherein the rigid structure comprises a first portion, partially enveloping the engine, and an external skin, which forms part of an external aerodynamic surface of the nacelle,
   wherein the two engine mounts that react the axial thrust forces are arranged diametrically opposite each other and are attached to the first portion.

2. The assembly according to claim 1, wherein the mounting comprises a plurality of other engine mounts, which are arranged in front of the two engine mounts.

3. The assembly according to claim 1, wherein the first portion of the rigid structure comprises a plurality of panels, which are stiffened by structural frames or spars, wherein the plurality of panels together form the external skin.

4. The assembly according to claim 3, wherein the structural frames bear the two engine mounts.

5. The assembly according to claim 3, wherein the spars bear the two engine mounts.

6. The assembly according to claim 1, wherein the rigid structure comprises a second portion, which is fixed to the fuselage and is configured to offset the first portion in relation to the fuselage, wherein the offset spaces the first portion apart from the fuselage.

7. The assembly according to claim 6, wherein the second portion comprises a plurality of spars, which extend in a direction of offsetting the engine away from the fuselage, and an axial beam connecting the spars and supporting the first portion.

8. The assembly according to claim 1, wherein the first portion is a shield configured to protect the fuselage against an engine break up.

9. The assembly according to claim 1, wherein the first portion is arranged to face a low-pressure compressor of the engine and is a shield configured to protect the fuselage against an engine break up.

10. The assembly according to claim 1, wherein the engine comprises a gas generator and a receiver, which has a pair of unducted contra-rotating propellers and is arranged at a rear of the gas generator.

11. The assembly according to claim 10, wherein the two engine mounts are attached to the engine near a junction between the gas generator and the receiver.

12. The assembly according to claim 1, wherein the nacelle comprises nacelle elements, including articulated cowls mounted on the first portion.

13. The assembly according to claim 1, wherein the rear section is a fuselage rear section of the aircraft.

14. The assembly according to claim 1, wherein the rear section is a vertical empennage of the aircraft, which is fixed to a fuselage rear section.

15. The assembly according to claim 1, wherein the first portion of the rigid structure comprises a plurality of panels, which are stiffened by structural frames and spars, wherein the plurality of panels together form the external skin.

16. The assembly according to claim 15, wherein the structural frames bear the two engine mounts.

17. The assembly according to claim 15, wherein the spars bear the two engine mounts.

18. The assembly according to claim 15, wherein the structural frames and spars bear the two engine mounts.

19. An aircraft comprising an assembly according to claim 1.

20. An assembly for an aircraft having a fuselage, the assembly comprising:
 a rear section of the aircraft;
 an engine;
 a nacelle;
 a mounting strut for mounting the engine on the rear section; and
 a mounting for mounting the engine on a rigid structure of the mounting strut,
 wherein the mounting comprises two engine mounts to react axial thrust forces generated by the engine,
 wherein the rigid structure comprises a first portion, partially enveloping the engine, and an external skin, which forms part of an external aerodynamic surface of the nacelle,
 wherein the two engine mounts that react the axial thrust forces are arranged diametrically opposite each other, both above and below a plane that is parallel to a transverse direction of the aircraft and passing through a longitudinal axis of the engine, at a rear of the rigid structure, and
 wherein the two engine mounts that react the axial thrust forces are attached to the first portion.

* * * * *